2 Sheets—Sheet 1.
G. M. BEARD.
WINDMILL.
No. 10,834. Reissued May 10, 1887.
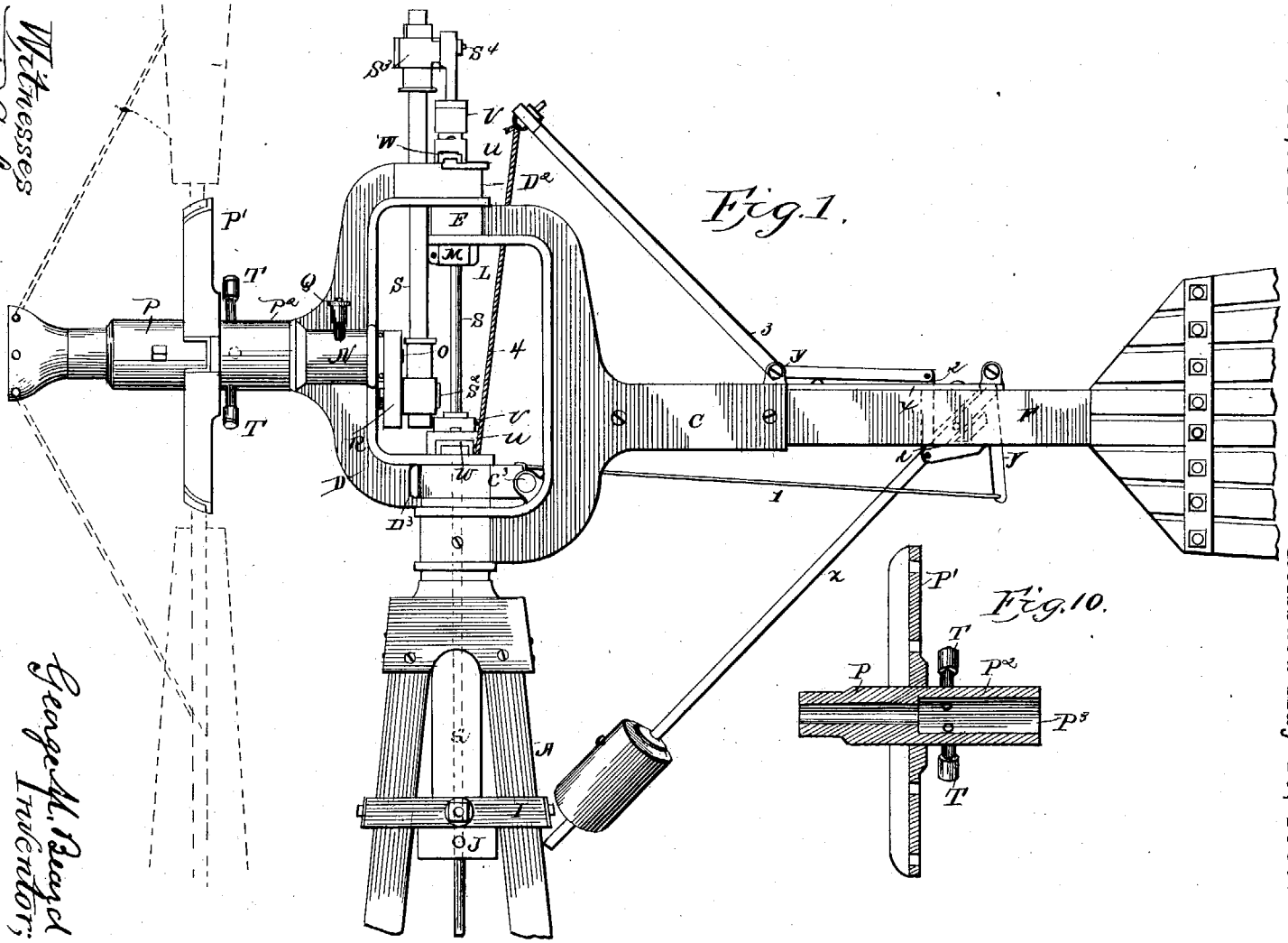
Witnesses
R. G. Laurie
Sarepta Specht
George M. Beard
Inventor;
By R. S. & A. P. Lacey
Atty's
N. PETERS, Photo-Lithographer, Washington, D. C.

G. M. BEARD.
WINDMILL.
No. 10,834. Reissued May 10, 1887.
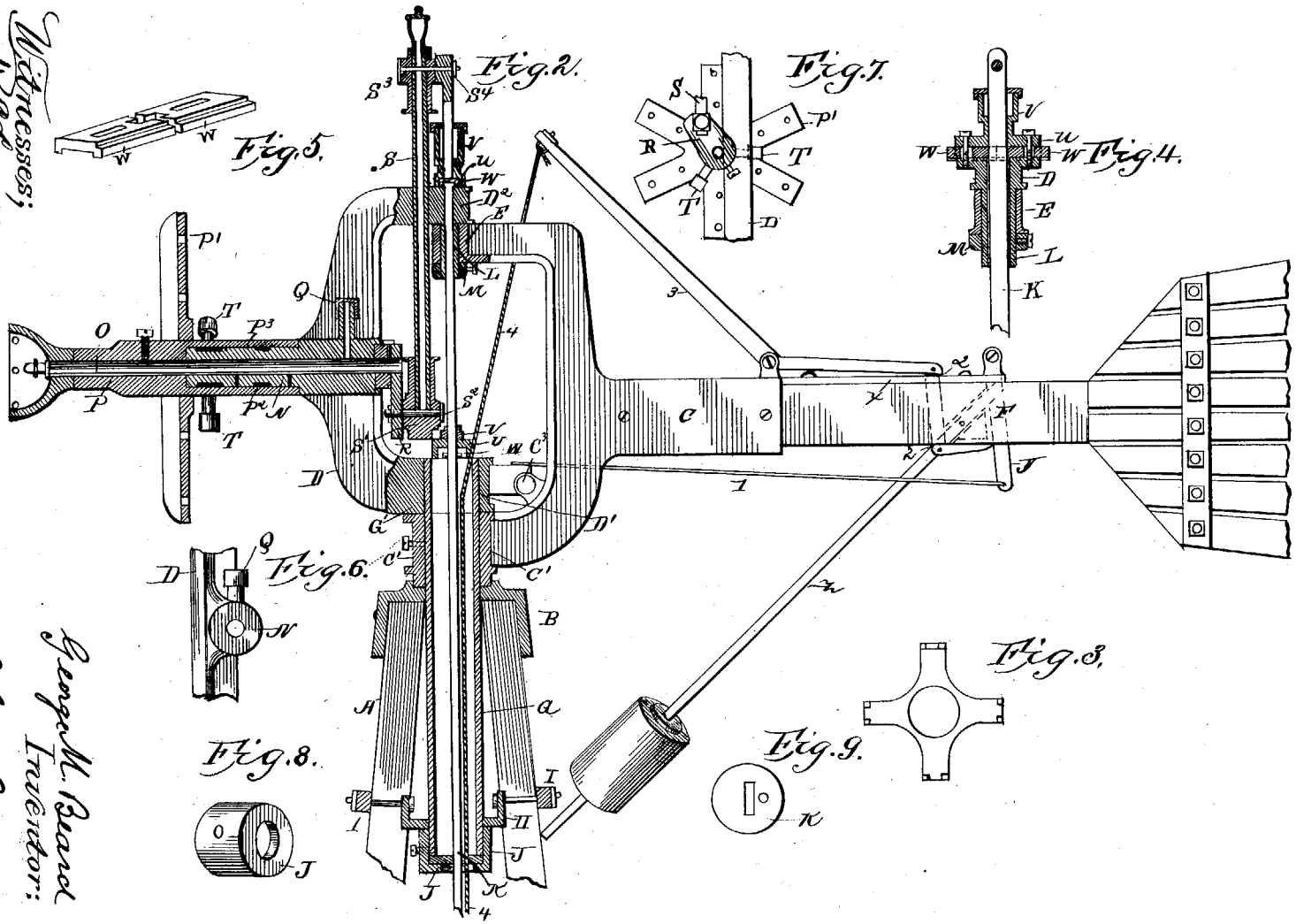
Witnesses;
R. C. Laurie
Sarepta Specht
George M. Beard
Inventor:
By R. S. & A. P. Lacey
Attys
N. PETERS, Photo-Lithographer, Washington, D. C.

UNITED STATES PATENT OFFICE.

GEORGE M. BEARD, OF AUBURN, INDIANA.

WINDMILL.

SPECIFICATION forming part of Reissued Letters Patent No. 10,834, dated May 10, 1887.

Original No. 299,327, dated May 27, 1884. Application for reissue filed May 5, 1886. Serial No. 201,237.

*To all whom it may concern:*

Be it known that I, GEORGE M. BEARD, of Auburn, in the county of De Kalb and State of Indiana, have invented certain new and useful Improvements in Windmills; and I do hereby declare the following to be a full, clear, and exact description of the invention, that will enable others skilled in the art to which it appertains to make and use the same, reference being had to the accompanying drawings, and to the letters of reference marked thereon, which form a part of this specification.

This invention relates to windmills; and it consists in the construction, combination, and arrangement of the several parts hereinafter fully described, and specifically pointed out in the claims.

It has for its object to provide a mill wherein the attachment of the wheel to the supporting-frame will be stronger and more durable than the means of attachment heretofore employed, and whereby the shaft by which the operating machinery is driven shall be relieved from all strain incident to the weight of the wheel.

It has for its further object to provide novel means for lubrication, whereby waste of oil is prevented and a great saving thereof effected, and the necessity for the frequent supplying of oil to the cups is avoided.

It has for its object to prevent jarring usually incident to the operation of the wheel and the crank on its shaft, thereby saving the mill from the injury sure to result from the continuation of such jarring.

In the drawings, Figure 1 is a side elevation showing a windmill which embodies my invention complete. Fig. 2 is a vertical longitudinal section of the upper portion of the mill and the castings. Fig. 3 is a detail view of the spider by which the mill is centered in position. Fig. 4 is a detail sectional view. Fig. 5 is a perspective of two of the adjusting-plates shown in their proper relation to each other. Fig. 6 is a detail view showing the bearing for the wheel placed to one side of the casting. Fig. 7 is a detail showing the crank attached to one end of the shaft and the wheel to the other. Fig. 8 shows the cuff on the lower end of the main tubular shaft. Fig. 9 is a detail of the disk which is interposed between the cuff and main shaft, and Fig. 10 is a detail section of the hub of the wheel.

The tower or derrick A and the cap B are of usual construction and adapted to support the mechanism of the mill. I employ two principal castings or frames, C and D, adapted to carry the vane and the wheel, respectively, and which are united together so that each can turn sidewise independently of the other without deranging or displacing any of the other operating parts. For convenience, the frame C is called the "vane-casting" and the frame D the "wheel-casting."

The vane-casting C has the arm of the vane F bolted to it, and it has its upper arm provided with a bearing, E, and its lower arm with a bearing, C′, for the purposes hereinafter explained. Depending from the bearing C′ is the main vertical tubular shaft G, which may be cast integral therewith or have its end fixed therein, so that it turns with the vane-casting. Projected above the bearing C′ is a tubular extension, G′, on which is journaled the lower end, D′, of the wheel-casting. This extension may be cast integral with the vane-casting, or may be provided by having the tubular shaft G extended upward through the bearing C′, as shown. The shaft G depends from the vane-casting, passes through the cap B on the tower, and its lower end is carried to a suitable distance below the cap and is held by a spider, H, which is secured to the posts of the tower. The spider consists of a flat plate provided with ears or lugs adapted to receive the bolts by which it is secured to cross-bars I on the posts of the tower. It is provided with a central opening, through which the shaft G extends, as shown. By means of the spider the lower end of the shaft can be adjusted from side to side to bring the mill to a vertical position.

On the lower end of the shaft G a collar or cuff, J, is fitted and rigidly fixed thereto by a set-screw. The cuff and spider prevent the mill from being raised upward. The lower end of the cuff is partially closed by an inwardly-extended rim, which serves as a support or bearing for a guide plate or disk, K, which is provided with an angular opening, through which the angular pump-rod passes. The disk is also provided with a small opening to permit the passage of the governor wire or cord, hereinafter named. The disk has the same diameter as the inner diameter of the cuff J, and extends under the end of the main shaft G, as shown. When the wheel is turned in or out of the wind, the pump-rod is also turned, and the disk turns with the movement of the latter. The purpose of this disk is for centering the pump-rod in the shaft, and serves as a guide therefor.

The lower end of the bearing on the lower arm of the vane-casting rests on the cap B, and turns in a seat therein. The end of the bearing on the lower arm of the wheel-casting fits over and turns upon the upper extension, G′, on the vane-casting, and it rests on the upper end of the bearing C′, as shown.

The bearing $D^2$ on the upper arm of the wheel-casting extends over the top of the upper bearing on the vane-casting, and is provided with a depending tubular journal or spindle, on which the bearing of the vane-casting is journaled. The journal L is extended below the bearing E, and a collar, M, slipped thereon and up against the lower end of said bearing, and is securely fixed in place by a set-screw.

When it is desired to erect the mill on the derrick, the vane or rudder is bolted to the vane-casting, and the vane and its castings are placed in position and the wheel-casting, with its wheel, is placed in its place by allowing the lower end of the wheel-casting to slip over the extension G′ and the tubular journal on the wheel-casting to pass through the opening in the bearing E on the vane-casting, and they are held together by a collar on the lower end of the tubular journal on the wheel-casting, and if necessary to separate the two castings, it is only necessary to remove the collar and pump-rod.

A tubular spindle, N, is provided on which the wheel is supported and revolves. This spindle is projected horizontally from and is held in place by the wheel-casting or frame D. The spindle is preferably set to one side of the center of the wheel-casting, so as to bring the axis of the wheel in a vertical plane different from the vertical plane in which the vane stands. When thus arranged, the wheel will be turned out of the wind when the latter is blowing with a velocity sufficient to overcome the weight of the governor. The central bore or opening in the spindle permits the passage of the wheel-shaft O, which is lubricated from the oil-cup Q. The spindle N will be provided with suitable grooves in its outer side, and with suitable openings made through it to let the oil which is fed from the cup Q pass to the shaft O.

When the weather is cold and the wheel is stopped, the oil within the grooves and openings in the spindle is liable to become chilled, and thereby prevented from running into the reservoirs. When the wheel is started, the chilled oil is at once sufficiently warmed by the action of the shaft O, and is thinned and runs outward and inward as the wheel revolves, and thereby lubricates both the spindle and the axle.

The hub P of the wheel P′ is provided with an axial bore through which the wheel-shaft O is passed. The hub and the shaft O are rigidly secured together by key, set-screw, or other well-known means at or near the outer end of the said shaft. The hub is bored out or otherwise formed, so as to provide an enlarged axial opening, $P^2$, whereby there is formed a sleeve, $P^3$, which slips onto and supports the wheel on its stationary spindle N. The enlarged axial opening extends from the inner end of the hub to a point or vertical line approximately in the same vertical plane with the wheel. The weight of the wheel is supported by the spindle N. The inner end of the sleeve of the hub forms a close joint with the casting D, by which dust is excluded. The wheel-shaft is made fast in the outer end of the hub, as before mentioned, while its inner end passes through the hollow spindle, and is provided with a crank, R, or other suitable device, whereby it is connected with and imparts motion to the pump-rod S or other operating machinery.

A series of oil-reservoirs, T, are arranged around the sleeve $P^3$, so that they discharge their contents onto the spindle N. These reservoirs are sufficient in number and are so disposed around the hub or sleeve that at least one of them will be on the under side thereof whenever the wheel is stopped. The oil in warm weather will drain into the pendent or under reservoir when the mill is at rest, and thus prevent the loss by the drainage at the ends of the bearings, as results with ordinary constructions. The oil is retained in the pendent till the wheel is again set in motion, and the instant the full reservoir is raised it discharges its contents onto the spindle. By this arrangement a great saving in oil is made and the bearings are lubricated just at the instant when most needed. The reservoirs are provided with removable caps, so that they can be opened when necessary for the purposes of cleaning them or for refilling. The arrangement of the oiling-cups and construction of the sleeve and spindle, as hereinbefore explained, obviates the necessity for the frequent oiling required by ordinary mills, waste is prevented, and the wheel and other parts of the mill are prevented from getting smeared over by the dripping oil.

The crank or disk R is provided with a short sleeve on its side and surrounding the opening which receives the end of the operating-shaft. This short sleeve is seated in a corresponding recess or socket in the casting D, making a close fit, as shown.

The pitman S is tubular, and is provided with a head, S′, at its lower end, through which the wrist-pin $S^2$ passes into the crank R. The tubular part of the pitman terminates at the wrist-pin $S^2$, as shown. The upper end of the pitman is provided with a suitable head, $S^3$, and so arranged as to leave the end of the said pitman open, and provided with an oil-inlet, so that the oil can be poured into it. The wrist-pin $S^4$, by which the pump-rod is secured to the head $S^3$, passes through the hollow pitman, as shown. The oil is permitted to pass downward, either through grooves made in the wrist-pin or through spaces formed by a slight enlargement of the pitman to permit the oil to pass around the said pin. Oil poured in the top of the tubular pitman lubricates both wrist-pins.

The pump-rod passes down through suitable guides, U, which are bolted upon the casting D, and upon the top of each one of these guides U is formed an oil-cup, V, which is filled with any suitable material, so as to prevent the oil from leaking away too rapidly. Each of the guides U is grooved underneath, and in these grooves are placed the slotted adjustable plates W, which are held in position by the same bolts which hold the guides in place. These adjustable plates W bear against opposite sides of the pump-rod, and serve to keep it always in a vertical position and to prevent any side movement, and can be adjusted to take up wear.

Secured upon the top of the vane-bar is a casting, X, upon the rear end of which is secured a bolt or rod, which serves as a journal for the triangular-shaped lever Y. Clamped against the outer side of the lever Y, which is provided with a suitable seat for that purpose, is the rod Z, upon which the sliding weight is placed, and which weight serves to pull the wheel back into the wind as soon as it is free to move. One of the ends of this triangular lever Y is connected directly with the casting D by means of the rod 1, while its other end is connected by means of the rod 2 with the lever 3, which is pivoted upon the front end of the casting X. The inner end of this lever 3 extends nearly over the center of the mill and has connected to it the rod, cord, wire, or chain 4, by means of which the wheel can be turned around with its edge to the wind whenever it is desired to stop its movement. The casting D is provided with suitable projections, $D^3$, which prevent the wheel from moving too far in either direction, and these projections strike against rubber springs $C^3$, in order to prevent any unnecessary jarring or shaking.

The spindle and hub, when constructed in the novel manner shown and secured together by the shaft, make a stronger and more durable wheel-connection than any of the ordinary known means.

The shaft O is relieved from all strain caused by the weight of the wheel, and by reason of this a much smaller shaft can be employed, and all jarring incident to ordinary wheels is avoided.

It will be seen that in the construction of the wheel-hub the inner end of the enlarged axial opening $P^3$ is completely closed and the end of the spindle fits snugly against the wall or breast in the hub at the inner end of said opening. The rim at the outer end of the hub fits snugly against a shoulder formed on the wheel-casting. This arrangement gives a firm position to the wheel, and any jarring caused by the rotation of the crank is prevented from reaching the wheel.

Having thus described my invention, what I claim, and desire to secure by Letters Patent, is—

1. In a windmill, the combination of the two castings C and D and tubular shaft G, the casting C being provided with the bearing E, and having the end of the tubular shaft G to project above the top of its lower portion, and the casting D being provided with an opening in its lower end to catch the top of the tubular shaft G, and having a tubular portion for passing down through the bearing E, substantially as shown.

2. The combination of the vane and the triangular-shaped lever, which is connected with the casting D by means of a connecting-rod and with an operating-lever, and which triangular-shaped lever has the weighted rod clamped to it, substantially as specified.

3. The combination, with the casting having an arm projecting therefrom and the pump-rod working vertically therethrough, of a guide fitted to a side of said arm and having a groove or recess in the side adjacent to the arm of the casting, and adjusting-plates seated in said groove or recess, so as to prevent lateral movement or turning, and adapted to bear upon opposite sides of the pump-rod, substantially as and for the purpose set forth.

4. The combination, with the wheel-casting, the arm projecting laterally therefrom, and the pump-rod working through the arm, of the guide secured to said arm, and having an oil-chamber formed therein between its ends and surrounding the pump-rod, substantially as set forth.

5. The combination, with the casting having a tubular spindle of uniform diameter projected therefrom, provided with a shoulder near its junction with the casting, of the wheel-hub having an enlarged axial opening end mounted upon said spindle, the outer end of which spindle bears against the inner end of the enlarged axial opening, while the shoulder on the spindle fits snugly against the inner end of said wheel-hub, substantially as shown and described, the shaft extended through the hub and spindle and keyed at is outer end to the hub, the crank keyed to the inner end of the shaft, and the pump-rod connected with and operated from said crank, substantially as and for the purpose described.

6. The combination, with the casting having a tubular spindle projecting therefrom, provided with annular grooves and openings leading from the bore through to the outer side, and an oil-cup located at the inner end of the spindle and communicating with its bore, of the wheel-hub having an enlarged axial opening to receive said spindle, and the wheel-shaft fastened in the outer end of the hub and extended through the spindle and connected with the pump-rod, whereby oil from said oil-cup lubricates the wheel-shaft and the wheel-hub, substantially as described.

7. The combination, with the casting having a tubular spindle provided with annular grooves and radial openings extending from its bore, of the wheel-hub having an enlarged axial opening to receive the tubular spindle, the shaft keyed to the outer end of the hub and passed through the spindle, and oil-cups arranged around the hub and communicating with the enlarged axial opening and lubricating said hub and shaft, substantially as described.

8. The combination, with the casting having a tubular spindle projected therefrom provided with annular grooves and radial openings, and an oil-cup located at the inner end of the spindle and communicating with its bore, of the wheel-hub having an enlarged axial opening to receive the spindle, the shaft keyed to the outer end of the hub and passed through the spindle, and the oil-reservoirs disposed around the hub and communicating with the enlarged opening, substantially as described, and for the purpose specified.

9. The combination, with the main tubular shaft and a spider arranged near the lower end of the shaft and the pump-rod, of a cuff partially closed at one end of the tubular shaft below the spider, and a disk provided with a central angular opening to fit the pump-rod, and interposed between the lower end of the main shaft and the inner partially-closed end of the cuff, substantially as and for the purpose set forth.

In testimony whereof I affix my signature in presence of two witnesses.

GEORGE M. BEARD.

Witnesses:

VAN BUREN HILLYARD,

G. P. KRAMER.